Figure 1:
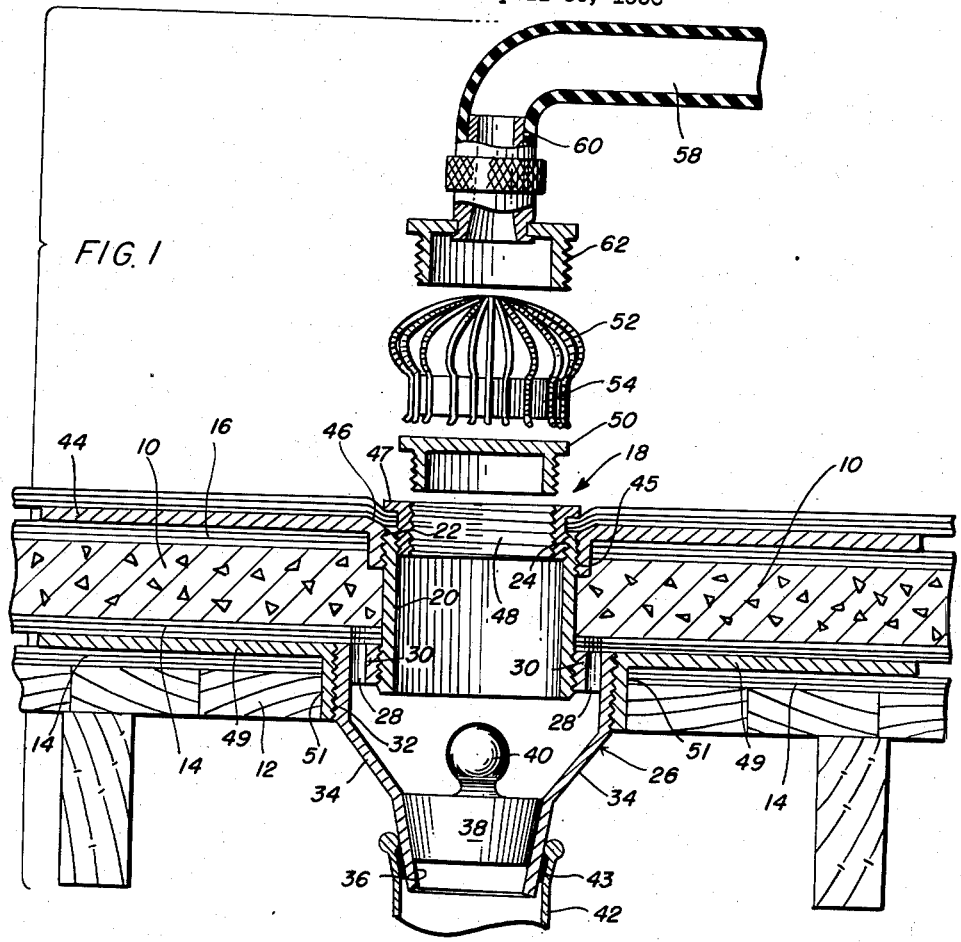

Jan. 24, 1961

C. C. FIGGE 2,969,027

METHOD AND APPARATUS FOR MAINTAINING INSULATION

Filed April 30, 1956

INVENTOR:
CARROLL C. FIGGE
BY

ATT'Y

United States Patent Office 2,969,027
Patented Jan. 24, 1961

2,969,027
METHOD AND APPARATUS FOR MAINTAINING INSULATION

Carroll C. Figge, Batavia, Ill.
(315 W. Madison St., Chicago, Ill.)

Filed Apr. 30, 1956, Ser. No. 581,609

4 Claims. (Cl. 50—16)

This invention relates in general to the care and conservation of heat conserving insulation for houses and other structures and is more particularly described in connection with roof and wall insulation in houses.

It is common practice in building structures to insert insulating material by applying a fluffy mass of asbestos, fiber glass, or fibrous padding between the inner and outer walls of a building and between the ceiling and floor of an overlying room, to pour a hardening insulating material between the inner and outer walls and over the top of a room, and to apply a fibrous board in the roof or ceiling of a structure, for the purpose of retaining the heat in cold weather, and to prevent the admission of heat in warm weather.

The present invention relates more particularly to the application of insulation in the form of a porous board of cork, Celotex and similar material on top of a substantially flat roof deck where it is subject not only to deterioration due to moisture and vapor from within the building and also to liquid and the weather from the outside of the insulation. If this insulation is enclosed by partially saturated roofing material at the inside of the insulation and by a commercial roofing applied at the outside, the vapors and liquids which permeate the roofing material may soon cause the insulation to be so filled with dirt, vapor and liquid that it becomes soggy and loses its insulating value for the purpose intended.

The present invention relates to the provision of means for aerating enclosed insulation and maintaining the pores and air spaces thereof free from vapor, liquid and dirt which tend to clog the insulation, destroying the insulating value or causing it to be much impaired.

An important object of the invention is in the provision of means which may be inserted within roofs already provided with insulation or built into new roofs having such insulation for circulating air continuously or periodically through the insulation by means of suction or a blower.

A further object of the invention is to provide a roof ventilator which may be installed through a layer of insulation, sealed or partially sealed on both sides to which a pressure or suction line may be applied for causing circulation of air through the insulation.

A further object of the invention is to equip roofs or other structures having enclosed insulation with fittings which will act as a drain for removing moisture from the roof and from the insulation and to which a pressure or suction line may be connected for blowing or sucking liquid from the insulation discharging it through the outlet and aerating the insulation.

Still a further object of the invention is to provide a method of maintaining and improving roof and wall insulation for houses and other structures, by installing fittings extending through the insulation and the opposite enclosing covers therefor so that purifying air or gas may be applied to the insulation in various places by suction and pressure to effect the removal of objectionable liquids and gases from the insulation and to apply air and gases under pressure to the insulation for cleaning, maintaining and improving it.

Still a further object of the invention is to provide a combined fitting extending through enclosed insulation having a strainer or a removable cover for preventing objectionable materials to pass into the fitting and having a discharge pipe extending therefrom for the removal of liquids and gases and having means for communication with the insulation through which it passes for applying air and gases to the insulation and removing them therefrom and also for permitting a drainage of liquids through the discharge and strainer of the fitting.

Other objects of the invention will appear in the specification and will be more apparent from the accompanying drawings in which, Fig. 1 is a perspective view of a portion of an insulated roof in accordance with the method of this invention in which there is a central fitting and a number of spaced fittings for carrying out the method.

Figure 2:
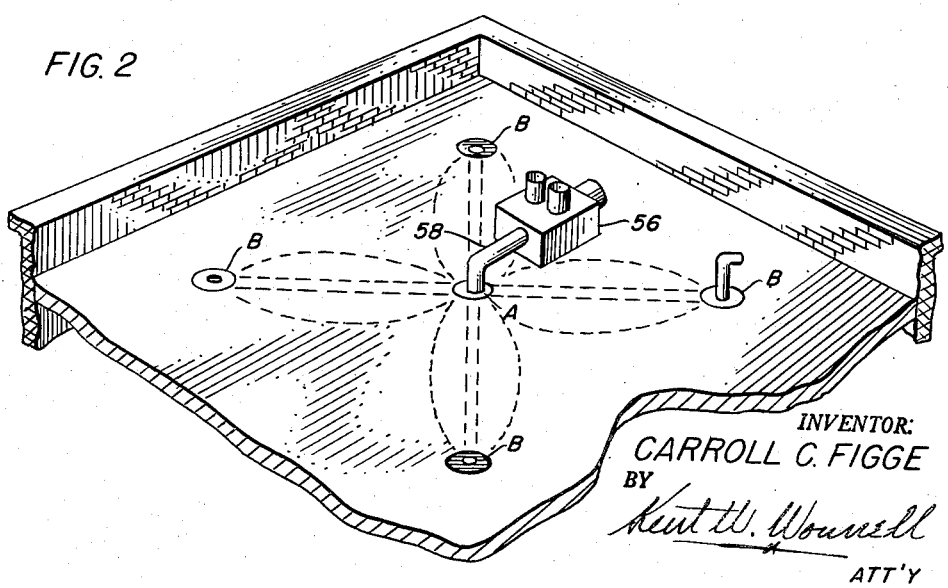

Fig. 2 is a sectional view of a fitting as applied to an enclosed roofing insulation in accordance with this invention, with bracketed parts which are used with the filling.

Water may be present in roof insulation of this type from shipping and storage before being applied to a roof, and when applied, it may take up moisture in the form of liquid from getting wet on the roof before it is protected by a cover and vapor from the inside of a building may develop into moisture which condenses in the insulation after it is applied. After installation, the roof may leak and water gets into the insulation where it accumulates due to the vapor barrier underlying it. When water gets into insulation, it lessens its efficiency, as it speeds up the transmission of heat by conduction. Water is also converted by heat into vapor causing the roofing to blister and disintegrate and the whole mass of roofing and insulation must be replaced in a relatively short time.

The present invention provides a method and apparatus for removing water from the insulation in the following ways: By a gravity pull on the water content which may be designated as free drainage; by absorption caused by contact with a suitable surface such as capillary attraction; and by an evaporation area exposed to air so that moisture works to the surface and is picked up and carried away by the air current. Thus the applicant's method is to maintain insulation by passing air through it when it is needed to dry it out.

Referring now more particularly to the drawings, it is now customary to apply a relatively thick layer of insulation 10 to a roof deck 12 and to enclose the insulation by a number of plies of roofing material 14 on top of the roof deck and below the insulation and to cover the insulation by a number of plies of roofing material 16. These enclosing covers are usually cemented together by a bituminous adhesive and are intended to be vapor-proof and water-proof, but proper roofing which is said to be saturated with water impervious materials is not so completely impregnated as to entirely exclude vapors from within a building nor to prevent a certain seepage of moisture either from leakage or standing water from the outside cover. The result sometimes is that the insulation 10 becomes soggy or permeated with water vapor which gradually turns into water and thus the insulation loses protecting value.

The insulating material may be formed of various cellular materials such as Celotex, ground cork, felted materials such as asbestos and fiber glass, but for roof insulation, a thick board-like layer of one or two inches thick is now commonly provided depending upon the nature of the building to which it is applied.

The present invention is applied to a building insulation structure for walls or for roofs. A pressure head or a plurality of pressure heads 18 as shown in Fig. 2 are therefore applied through the insulation and through the enclosing covers therefor to provide means for maintaining the insulation in a dry condition by aerating it either by a flow of air under pressure or under suction.

Each pressure head has a central hollow metal sleeve 20 with external threads 22 at each end and with internal threads 24 at the upper or outer end. This sleeve 20 is preferably of a length sufficient to extend through the insulation 10 and the roofing material 14 and 16 at the lower and upper sides of the main body of the insulation 10 which are intended to enclose it.

At the lower end of the sleeve 20 is a fitting 26 which has an upper end larger in diameter than the sleeve 20 and connected to the lower threads 22 by an inwardly extending threaded portion 30 which has openings 28 all around the outside of the sleeve 20. The outside of this upper portion is provided with external threads 32 and below this threaded portion is a downwardly converging funnel 34 with a reduced seat 36 for a removable plug 38 having a knob 40 and of an external diameter less than the internal diameter of the sleeve 20 so that the plug may be manually inserted and removed through the upper end of the sleeve when desired.

The lower end of the seat 36 is inserted into a drain pipe 42 to which it is connected at its upper flanged end by a babbitt joint 43 or any other suitable connection.

To more completely seal the insulation around the pressure head, a perforated plate 44 much larger in extent than the pressure head is secured to the upper external threads 22 by a threaded neck 45 which has a downwardly inclined portion 46 at its inner periphery which together with the upper end of the sleeve 20 forms a depressed seat for a flange 47 of a packing gland 48 which is threaded upon the internal threads 22 for clamping the overlying plies of roofing material 16 tightly in place, the top of the flange being substantially level or below the outer level of the outside plies of the roofing material so that water collecting upon the roof will flow freely into the sleeve 20 through the packing gland. For a free flow of liquid through the pressure head, the plug 38 is manually moved and the plug 38 should therefore be collapsible or no larger than the inside opening of the packing gland 48.

Thus the upper perforated plate 44 is sealed in place on top of the insulation 10 by cover plies 16 of roofing material above and below the plate to make a firm waterproofing connection around the pressure head and with the remainder of the roof.

In a like manner, an extending plate 49 having an internally threaded hub 51 is connected to the external threads 32 of the fitting 26 at the upper level of the inwardly extending portion 30 thereof. This plate is also connected by enclosing plies 14 below the insulation 10, above and below the extending portion of the plate 49, the plies 14 overlying the plate terminating at the outer periphery of the drain openings 28 and the plies below plate 49 terminating at the outside of the hub 51. These plies are cemented together to the roof deck and to the plate 49 by bituminous or other adhesive material in a well known manner to make a relatively waterproof joint.

Liquid which may be present in the insulation 10 will be directed by the adjacent plies 14 into the drain openings 28 at the periphery of the sleeve 20 and will be directed jointly in the funnel portion 34 and through the seat 36 and into the drain pipe 42 when the plug 38 is removed.

To install this pressure head in a roof which is already provided with insulation and the upper and lower covers therefor, it is necessary to make a hole through them slightly larger than the size of the pressure head, and to make a corresponding hole in the roof deck through which the lower end fitting of the pressure head extends.

In applying pressure heads of this kind, it is a relatively simple matter to set or build them in place while the roof is being completed. After a roof has been completed, it is frequently necessary to remove a much larger portion of the insulation and roofing material to set the pressure head and its projecting plates in position and to build the insulation and roofing material around them.

At the top of the pressure head is a cap 50 which is firmly secured in place preferably by threading it in the internal threads of the gland 48 if it is desired to seal the upper end of the pressure head. When the pressure head is left open at the top, a removable wire strainer 52 may be applied within the packing gland 48 having outwardly bent extremities which fit within the gland 48 to hold it in place. The extremities of the strainer may be connected by an inner collar which holds them in spaced relation and connects them together for insertion into the packing gland.

To connect power means 56 to the pressure head, a fixed or flexible hose 58 is connected to a short pipe 60 through a removable pressure cap 62 which has external threads for engaging the internal threads of the packing gland 48 when the cap 50 is removed.

To apply pressure or suction through any pressure head, the plug 38 is first removed in the lower tapering seat 36 of the pressure head fitting, the pressure cap 62 is applied at the upper end of the pressure head and air or gas under suction or pressure is then applied through the openings 28 of the pressure head in direct communication with the insulation and radiating or extending in all directions therefrom.

In power operation, this method for maintaining insulation in dry or insulating condition, power means 56 for applying pressure or suction is connected to any one of the pressure heads but preferably to a central head relative to other pressure heads B which may be located at spaced distances from the pressure head A. Pressure or suction may be applied to any one of the heads and if used in connection with a number of other pressure heads B, the latter will be open at the top and closing plugs 38 are spaced in the bottoms of the pressure heads which will confine the flow of air to the insulation between the pressure head A and the various other pressure heads spaced therefrom.

In some cases, it is found desirable to withdraw air from a central pressure head and in other cases the air may be forced into a central pressure head. It is also possible to additionally control other pressure heads B by applying closing caps 50 thereto with the plugs 38 in place which will tend to shut off the air under pressure or suction from that particular head.

With the construction shown in Fig. 2, any question of moisture within the insulation will tend to flow downwardly through the openings 28 of that particular head when the plug 38 is removed and a flow of air through the insulation will be induced by the passage of water from the top of the roof through the pressure head and into the drain pipe. A downward flow of water through the drain pipe tends to pull air through the openings 28 from the insulation thus causing an automatic displacement of air and a suction in the insulation.

It may be advisable at times to close all or some of the pressure heads both at the top by applying the caps 50 and at the bottom by applying the plugs 38, but under ordinary conditions, it is best to remove the caps and plugs unless suction or pressure is to be applied individually to the pressure heads or to a plurality of them as described.

While a preferred construction and operation of this invention has been described in some detail, it should be regarded by way of illustration and example rather than as a restriction or limitation thereof, as many changes in the construction, combination and arrangement of the parts may be made without departing from the spirit and scope of the invention.

I claim:
1. A hollow pressure head for aerating roof insulation enclosed by upper and lower covers substantially impervious to liquids, comprising a sleeve open at the top and bottom and of a length to extend through the insulation and covers, a fitting with a top larger than the sleeve secured around the bottom end of the sleeve, means securing the top of the sleeve and the outer edge of the top of the fitting to the covers with the insulation between them, the fitting having openings at the top thereof and outside of the sleeve to communicate with the insulation and with a lower funnel-shaped portion which tends to cause a suction of air and liquid through said openings when liquid passes downwardly from the roof through the sleeve for thereby drying the insulation.

2. A hollow pressure head for aerating roof insulation enclosed by upper and lower covers substantially impervious to liquids, comprising a sleeve open at the top and bottom and of a length to extend through the insulation and covers, a fitting with a top larger than the sleeve secured around the bottom end of the sleeve, means securing the top of the sleeve and the outer edge of the top of the fitting to the covers with the insulation between them, the fitting having openings at the top thereof and outside of the sleeve to communicate with the insulation and with a lower funnel-shaped portion which tends to cause a suction of air and liquid through said openings when liquid passes downwardly from the roof through the sleeve, said means comprising plates extending outwardly from the sleeve and fitting above and below the insulation and sealed thereto by said covers to provide a substantially fluid-tight connection.

3. A pressure head in accordance with claim 2, in which the top plate has a downwardly inclined portion adjacent the sleeve for seating the upper cover therein, and a packing gland secured in the top of the sleeve, said gland having an outwardly extending flange over the upper cover so as to squeeze the upper cover between the flange of the gland and said top plate to form a flush connection between the upper cover of the roof and the top of the drain so that roof water will drain through said sleeve.

4. A pressure head in accordance with claim 1, having a removable cap to fit tightly at the top of the sleeve, and a removable plug seated in said funnel shaped portion at the bottom of the sleeve and removable through the sleeve from the top thereof when the cap is removed.

References Cited in the file of this patent
UNITED STATES PATENTS

| | | |
|---|---|---|
| 1,180,018 | Degnon | Apr. 18, 1916 |
| 1,931,066 | Eckert | Oct. 17, 1933 |
| 2,121,789 | Davey | June 28, 1938 |
| 2,156,890 | Wuringer | May 2, 1939 |
| 2,324,545 | Svirsky | July 20, 1943 |
| 2,455,320 | Stephens | Nov. 30, 1948 |
| 2,553,881 | Suttles | May 22, 1951 |
| 2,619,920 | Lindquist | Dec. 2, 1952 |
| 2,623,364 | Munters | Dec. 30, 1952 |
| 2,703,911 | Griffin | Mar. 15, 1955 |
| 2,833,229 | Donegan | May 6, 1958 |